United States Patent
Rosengren

(10) Patent No.: US 12,061,492 B2
(45) Date of Patent: Aug. 13, 2024

(54) CIRCUIT COMPRISING AN ADJUSTABLE ZENER VOLTAGE

(71) Applicant: SAAB AB, Linköping (SE)

(72) Inventor: Anders Rosengren, Järfälla (SE)

(73) Assignee: SAAB AB, Linköping (SE)

( * ) Notice: Subject to any disclaimer, the term of this patent is extended or adjusted under 35 U.S.C. 154(b) by 265 days.

(21) Appl. No.: 17/633,605

(22) PCT Filed: Aug. 13, 2019

(86) PCT No.: PCT/SE2019/050743
§ 371 (c)(1),
(2) Date: Feb. 8, 2022

(87) PCT Pub. No.: WO2021/029795
PCT Pub. Date: Feb. 18, 2021

(65) Prior Publication Data
US 2022/0317717 A1    Oct. 6, 2022

(51) Int. Cl.
*G05F 3/18* (2006.01)
*G05F 1/46* (2006.01)
*G05F 1/565* (2006.01)

(52) U.S. Cl.
CPC ............... *G05F 3/18* (2013.01); *G05F 1/468* (2013.01); *G05F 1/565* (2013.01)

(58) Field of Classification Search
CPC ............. G05F 1/565; G05F 1/468; G05F 3/18
See application file for complete search history.

(56) References Cited

U.S. PATENT DOCUMENTS

| | | | |
|---|---|---|---|
| 3,881,150 A | 4/1975 | Gay | |
| 4,063,147 A * | 12/1977 | Hatanaka | G05F 3/18 307/15 |
| 9,290,137 B2 * | 3/2016 | Ooya | B60R 16/033 |
| 2009/0096438 A1 * | 4/2009 | Yamada | G05F 1/567 323/311 |
| 2016/0276496 A1 | 9/2016 | Simola et al. | |
| 2023/0327554 A1 * | 10/2023 | Warnes | H03K 17/0822 323/271 |

FOREIGN PATENT DOCUMENTS

| | | |
|---|---|---|
| DE | 2307264 A1 | 8/1974 |
| GB | 1422226 A | 1/1976 |
| JP | 0659907 U | 8/1994 |
| JP | H0659907 U * | 8/1994 |

(Continued)

OTHER PUBLICATIONS

Extended European Search Report mailed Apr. 14, 2023 for European Application No. 19941279.2, 10 pages.

(Continued)

*Primary Examiner* — Sisay G Tiku
(74) *Attorney, Agent, or Firm* — Sage Patent Group

(57) ABSTRACT

An electronic circuit is included, which acts as a zener diode below a zener voltage, and as a constant current source above the zener voltage comprising an input terminal, an output terminal, a first resistor, a second resistor, a third resistor, a fourth resistor, a first NPN-transistor, a second NPN-transistor, a PNP-transistor, and a voltage reference, where the zener voltage of the electronic circuit can be selected by a user.

8 Claims, 2 Drawing Sheets

(56) References Cited

FOREIGN PATENT DOCUMENTS

| JP | 08328675 A | | 12/1996 | | |
|----|------------|---|---------|---|---|
| JP | 2006236223 A | * | 9/2006 | | |
| JP | 2014049105 A | | 3/2014 | | |
| JP | 2020187560 A | * | 11/2020 | ............. | G05F 1/569 |

OTHER PUBLICATIONS

International Search Report and Written Opinion mailed Mar. 12, 2020 for International Application No. PCT/SE2019/050743, 14 pages.

* cited by examiner

CIRCUIT COMPRISING AN ADJUSTABLE ZENER VOLTAGE

CROSS-REFERENCE TO RELATED APPLICATIONS

This application is a 35 U.S.C. § 371 national stage application for International Application No. PCT/SE2019/050743, entitled "CIRCUIT COMPRISING AN ADJUSTABLE ZENER VOLTAGE", filed on Aug. 13, 2019, the disclosures and contents of which are hereby incorporated by reference in their entireties.

TECHNICAL FIELD

The present invention relates to an electronic circuit which acts as a zener diode below a zener voltage, and as a constant current source above the zener voltage. The zener voltage may be adjusted to a desired voltage.

BACKGROUND ART

Conventional zener diodes are e.g. widely used as voltage references and as shunt regulators to regulate the voltage across small circuits. Zener diodes are further used in high voltage circuits. However, the power dissipation in a conventional zener diode will be very high when the zener voltage or breakdown voltage is reached, if no current limiting function is applied. In a high voltage circuit, the power dissipation may be harmful or may damage the zener diode, since the current through the zener diode will increase exponentially above the zener voltage.

There is thus room for an improved circuit having an adjustable zener voltage and a selectable constant current function.

DISCLOSURE OF INVENTION

An object of the invention is therefore to provide an electronic circuit in which a zener voltage can be selected, and in which a constant current output can be selected.

The solution to the problem according to the invention is described in the characterizing part of claim 1 regarding the electronic circuit. The other claims contain advantageous further developments of the inventive electronic circuit.

In an electronic circuit comprising an input terminal, an output terminal, a first resistor, a second resistor, a third resistor, a fourth resistor, a first NPN-transistor, a second NPN-transistor, a PNP-transistor, and a voltage reference, the object of the invention is achieved in that the first resistor is connected between the input terminal and the collector of the first NPN-transistor, the second resistor is connected between the collector of the first NPN-transistor and the output terminal, the emitter of the first NPN-transistor is connected to the output terminal, the base of the first NPN-transistor is connected to the collector of the PNP-transistor, the fourth resistor is connected between the collector of the PNP-transistor and the output terminal, the emitter of the PNP-transistor is connected to the input terminal, the base of the PNP-transistor is connected to the collector of the second NPN-transistor, the third resistor is connected between the input terminal and the collector of the second NPN-transistor, the base of the second NPN-transistor is connected to collector of the first NPN-transistor, and the voltage reference is connected between the emitter of the second NPN-transistor and the output terminal.

By this first embodiment of an electronic circuit according to the invention, a circuit in which the zener voltage can be selected to a desired value is provided. A zener voltage can also be referred to as a breakdown voltage. In the electronic circuit, the constant output current of the circuit above the zener voltage can also be selected to a desired value. The inventive circuit will have the same properties as a regular zener diode before the zener voltage is reached, and will act as a constant current source above the zener voltage. In this way, the power dissipation in the circuit will be limited, since the power dissipation will increase linearly with an applied external voltage above the zener voltage. In a conventional zener diode, the power dissipation increases exponentially with an applied external voltage above the zener voltage.

A further advantage of the electronic circuit according to the invention is that the zener voltage can be selected in dependency of a voltage reference of the circuit. This allows a wide range of different zener voltages to be achieved, also with higher voltage ranges than conventional zener diodes. This will at the same time allow for an electronic circuit having a small footprint.

In one example, a current limiting resistor is connected to the base of the first NPN-transistor. This will improve the performance of the electronic circuit further. It is also possible to connect a current limiting resistor to the base of the first PNP-transistor. This will also improve the performance of the electronic circuit further.

The electronic circuit is well suited to be used as a building block in high voltage applications, where a voltage and/or current should be limited. The electronic circuit may be used in a similar manner as a general purpose high voltage zener diode. One example of a high voltage application is a power supply unit.

BRIEF DESCRIPTION OF DRAWINGS

The invention will be described in greater detail in the following, with reference to the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1A:
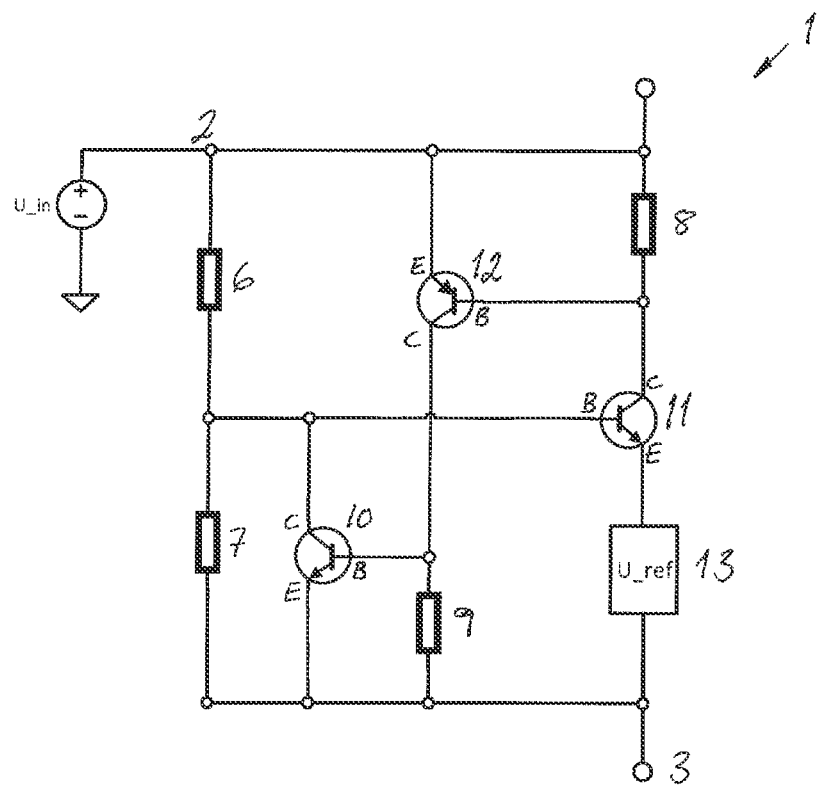
FIGS. 1A and 1B show an example of an electronic circuit according to the invention.
Figure 1B:
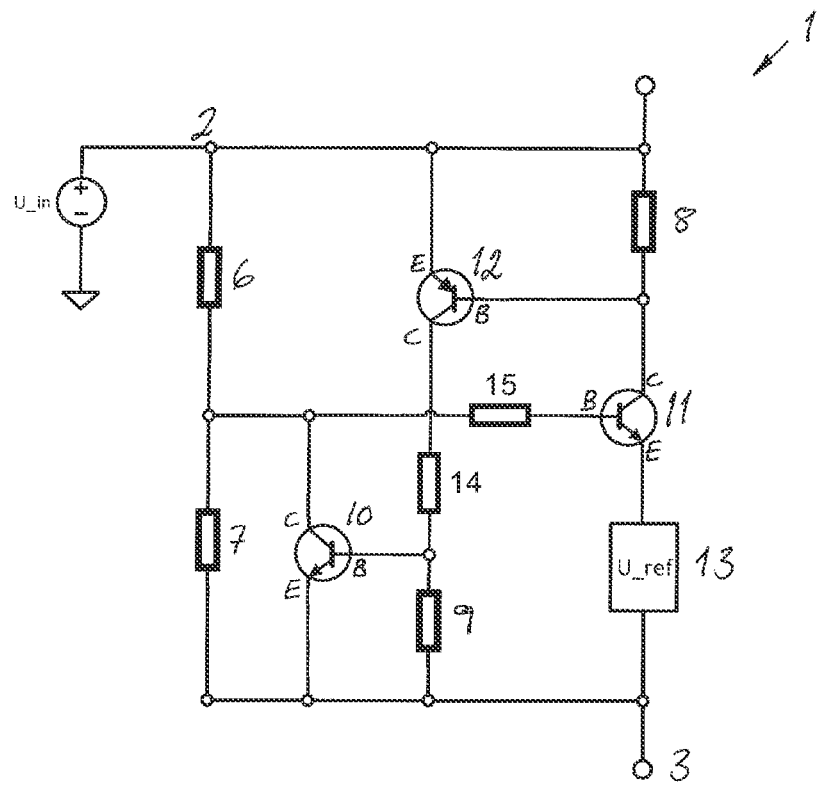

FIG. 1 shows an example of an electronic circuit 1. The electronic circuit 1 comprises an input terminal 2 to which a supply voltage is to be connected. The supply voltage is adapted to the use of the system in which the electronic circuit is mounted, but should be larger than the required output voltage of the system. The electronic circuit 1 further comprises an output terminal 3. The zener voltage of the circuit is measured between the input terminal 2 and the output terminal 3. The electronic circuit 1 further comprises a first resistor 6, a second resistor 7, a third resistor 8, a fourth resistor 9, a first NPN-transistor 10, a second NPN-transistor 11, a PNP-transistor 12 and a voltage reference 13. These components are preferably realized as surface-mounted components on a PCB. The first resistor 6 is connected between the input terminal 2 and the collector of the first NPN-transistor 10. The second resistor 7 is connected between the collector of the first NPN-transistor 10 and the output terminal 3. The leakage current of the electronic circuit below the zener voltage is determined by the first resistor 6 and the second resistor 7. The resistance value of the first resistor may be relatively high, such as around 1 MOhm, in order to minimize the leakage current of the electronic circuit 1. The resistance value of the second resistor is preferably lower, e.g. in the range between 10 kOhm to 100 kOhm.

The zener voltage Uz of the electronic circuit 1 is determined by the relationship between the first resistor, the second resistor and the voltage reference according to the formula:

$$Uz = \left(1 + \frac{R1}{R2}\right) * Uref$$

The emitter of the first NPN-transistor 10 is connected to the output terminal 3. The base of the first NPN-transistor 10 is connected to the collector of the PNP-transistor 12 and to one side of the fourth resistor 9. The fourth resistor 9 is connected between the collector of the PNP-transistor 12 and the output terminal 3. The resistance value of the fourth resistor is not critical, but may be in the range around 10 kOhm. The emitter of the PNP-transistor 12 is connected to the input terminal 2. The collector of the PNP-transistor 12 is connected to the base of the first NPN-transistor 10 and to one side of the fourth resistor 9. The base of the PNP-transistor 12 is connected to the collector of the second NPN-transistor 11 and to one side of the third resistor 8. The third resistor 8 is connected between the input terminal 2 and the collector of the second NPN-transistor 11. The base of the second NPN-transistor 11 is connected to the collector of the first NPN-transistor 10 and to one side of the first resistor 6 and the second resistor 7. The voltage reference 13 is connected between the emitter of the second NPN-transistor 11 and the output terminal 13.

The voltage reference 13 is in one example a conventional zener diode, where the zener voltage of the zener diode is selected in dependency of the desired zener voltage of the electronic circuit 1 and the relation between the first resistor 6 and the second resistor 7. For a high voltage application, the voltage of the voltage reference is preferably above 10 volts.

The constant output current Ic of the electronic circuit 1 above the zener voltage is determined by the third resistor 8 and the PNP-transistor 12. The resistance value of the third resistor 8 is preferably in the range around 1 kOhm, but is selected in dependency of the desired constant current output.

In one example, a fifth resistor 14 may be connected between the base of the first NPN-transistor 10 and the collector of the PNP-transistor 12. The resistance value of the fifth resistor is preferably low, in the range around 100 Ohm. A sixth resistor 15 may be connected between the base of the PNP-transistor 12 and the collector of the second NPN-transistor 11 in the same manner. The purpose of the fifth resistor 14 and the sixth resistor 15 is to limit the current and to balance the circuit.

Figure 2:
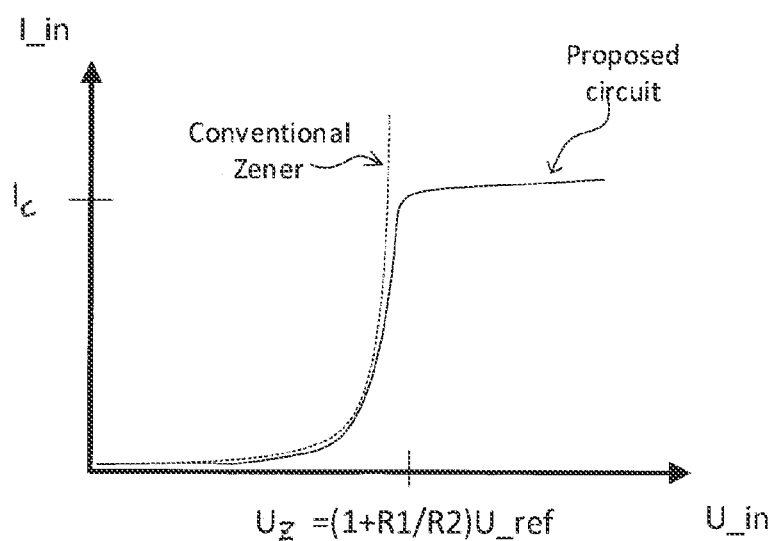
FIG. 2 shows a graph of the current through an electronic circuit according to the invention.

FIG. 2 shows a graph of a typical example of the electronic circuit 1. The input voltage Uin to the circuit is represented by the x-axis. The output current Iin is represented by the y-axis. The dotted line shows the relation between voltage and current for a conventional zener diode. The full line shows the relation between voltage and current for the electronic circuit 1. As can be seen in the graph, the output current is more or less constant above the zener voltage.

The invention is not to be regarded as being limited to the embodiments described above, a number of additional variants and modifications being possible within the scope of the subsequent patent claims.

REFERENCE SIGNS

1: Electronic circuit
2: Input terminal
3: Output terminal
6: First resistor
7: Second resistor
8: Third resistor
9: Fourth resistor
10: First NPN-transistor
11: Second NPN-transistor
12: PNP-transistor
13: Voltage reference

The invention claimed is:

1. An electronic circuit comprising an input terminal, an output terminal, a first resistor, a second resistor, a third resistor, a fourth resistor, a first NPN-transistor, a second NPN-transistor, a PNP-transistor, and a voltage reference, wherein the first resistor is connected between the input terminal and a collector of the first NPN-transistor, the second resistor is connected between the collector of the first NPN-transistor and the output terminal, an emitter of the first NPN-transistor is connected to the output terminal, a base of the first NPN-transistor is connected to a collector of the PNP-transistor, the fourth resistor is connected between a collector of the PNP-transistor and the output terminal, an emitter of the PNP-transistor is connected to the input terminal, the collector of the PNP-transistor is connected to the base of the first NPN-transistor, a base of the PNP-transistor is connected to a collector of the second NPN-transistor, the third resistor is connected between the input terminal and the collector of the second NPN-transistor, a base of the second NPN-transistor is connected to the collector of the first NPN-transistor, and the voltage reference is connected between an emitter of the second NPN-transistor and the output terminal.

2. The electronic circuit according to claim 1, wherein the voltage reference is a zener diode.

3. The electronic circuit according to claim 1, wherein a fifth resistor is connected between the base of the first NPN-transistor and the collector of the PNP-transistor.

4. The electronic circuit according to claim 1, wherein a sixth resistor is connected between the base of the PNP-transistor and the collector of the second NPN-transistor.

5. The electronic circuit according to claim 1, wherein a zener voltage of the electronic circuit is defined as the voltage difference between the input terminal and the output terminal.

6. The electronic circuit according to claim 5, wherein the zener voltage is dependent on the first resistor, the second resistor and the voltage reference.

7. The electronic circuit according to claim 1, wherein a constant current is outputted at the output terminal of the electronic circuit and is dependent on the third resistor and the PNP-transistor.

8. A power supply unit, comprising an electronic circuit according to claim 1.

* * * * *